(12) United States Patent
Peitz et al.

(10) Patent No.: US 10,477,655 B2
(45) Date of Patent: Nov. 12, 2019

(54) LIGHTING SYSTEM WITH AUTOMATIC BEACON CONFIGURATION

(71) Applicant: OSRAM GMBH, Munich (DE)

(72) Inventors: Christoph Peitz, Lippstadt (DE); Henry Feil, Unterhaching (DE); Michel Stutz, Munich (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 16/071,054

(22) PCT Filed: Feb. 16, 2017

(86) PCT No.: PCT/EP2017/053525
§ 371 (c)(1),
(2) Date: Jul. 18, 2018

(87) PCT Pub. No.: WO2017/153144
PCT Pub. Date: Sep. 14, 2017

(65) Prior Publication Data
US 2019/0037672 A1    Jan. 31, 2019

(30) Foreign Application Priority Data
Mar. 11, 2016   (DE) .................. 10 2016 104 483

(51) Int. Cl.
*H05B 37/02* (2006.01)
(52) U.S. Cl.
CPC ....... *H05B 37/0272* (2013.01); *H05B 37/029* (2013.01)
(58) Field of Classification Search
CPC .......................... H05B 37/0272; H05B 37/029

USPC .......................................................... 315/291
See application file for complete search history.

(56) References Cited

U.S. PATENT DOCUMENTS

| 2006/0261971 | A1  | 11/2006 | Danvir et al. |
| 2008/0265799 | A1* | 10/2008 | Sibert ............... H05B 37/0245 315/292 |
| 2009/0026978 | A1* | 1/2009  | Robinson .......... H05B 37/0245 315/294 |
| 2010/0019921 | A1  | 1/2010  | Kreiner et al. |
| 2013/0134906 | A1* | 5/2013  | Picariello .......... H05B 37/0245 315/312 |
| 2017/0286889 | A1* | 10/2017 | Yu ................... G06Q 10/063114 |
| 2017/0339771 | A1* | 11/2017 | Liu .................... H05B 37/0272 |

FOREIGN PATENT DOCUMENTS

| DE | 102013226413 A1 | 6/2015 |
| WO | 2009004539 A1   | 1/2009 |

OTHER PUBLICATIONS

PCT; PCT App No. PCT/EP2017/053525; International Search Report and Written Opinion dated May 4, 2017.

* cited by examiner

*Primary Examiner* — Daniel D Chang
(74) *Attorney, Agent, or Firm* — Fitch, Even, Tabin & Flannery LLP

(57) ABSTRACT

The individual configuration of beacons in lighting systems is to be simplified. Therefore, a lighting system with a lighting device and a beacon arranged in or at the lighting device is provided. The lighting system comprises a sensor device for acquiring an environmental parameter relating to an environment of the lighting system. Moreover, the beacon is formed to automatically configure itself based on the environmental parameter.

15 Claims, 3 Drawing Sheets

LIGHTING SYSTEM WITH AUTOMATIC BEACON CONFIGURATION

CROSS-REFERENCE TO RELATED APPLICATIONS

This application is a U.S. national phase application filed under 35 U.S.C. § 371 of International Application Number PCT/EP2017/053525, filed Feb. 16, 2017, designating the United States, which claims benefit of German Patent Application No. 10 2016 104 483.0, filed on Mar. 11, 2016.

FIELD

The present invention relates to a lighting system with a lighting device and a beacon arranged at the lighting device. Moreover, the present invention relates to a method for configuring a beacon of a lighting system comprising a lighting device and the beacon in or at the lighting device.

BACKGROUND

The so-called "beacon technology" is based on a transmitter-receiver system. A "beacon" (in German: "Leuchtfeuer" or also "Bake" or "Peilsender") is a small, mostly battery-operated transmitter emitting a signal in (definable) time intervals mostly on the Bluetooth low energy standard. The radio signal of each beacon is characterized by a unique identification number (so-called UUID). Beacons can be used to impart a digital identification to objects and sites. Objects (at which a beacon is installed) and sites (at which a beacon is installed e.g. at a wall) can be identified by terminals (e.g. smart devices) in the signal field of the beacon in this manner.

Beacons can be used for identification of a site or for locating. By placing one or more beacons in a building area, thus, a type of radio-based raster arises, in which a smart device can locate itself via the BLE (Bluetooth low energy) interface as well as corresponding algorithms. Therein, the individual identification numbers of the installed beacons give an identifier to a site, by which a smart device can approximately determine the position (basic transmitting area of the beacon can be determined). Algorithms on the smart device can improve the position accuracy e.g. via signal strengths. Therein, it is required that the smart device can access information in a data storage (e.g. on a Cloud server) (e.g. identification number and mapping). If a terminal (for example smart device) gets into the range of a transmitter, it can detect the identification number and for example determine the site via server query. Therein, the locating algorithms access the received signal strength of the beacons in the ambit among other things, in particular as an indicator for the distance to the respective beacon.

The present invention is based on the basic invention to install beacons in light engineering/lighting technique. Therein, the advantage is in particular utilized that a light installation offers a permanent energy access to provide the beacon with energy. Therefrom, the advantage in turn arises that the battery of the beacon does not have to be exchanged and thus corresponding life cycle costs and processes, respectively, can be saved. Moreover, parameterizations of the beacon with higher energy consumption can also be adjusted without the lifetime of the beacon being reduced. Installation processes of beacons and light engineering can additionally be unified. A further advantage is a defined locking position of a beacon transmitter, which is well protected from manipulation. Thus, a clear and secure identifier can be imparted to a site.

The following enumeration offers an overview of beacons in light engineering:
- using the energy supply of the light installation instead of a battery to reduce the life cycle costs of the beacon;
- using the energy supply of the light installation to adapt the transmitting parameters to the service and not to the available residual energy or the parameters of the battery (for example, frequent transmitting cycles generate high accuracy of the services, but also higher energy consumption);
- exchange of the battery of conventional beacons carries risks (e.g. with regard to errors in the handling);
- avoiding unavailability of the services by an uninterruptible energy supply of the beacon;
- installation site below the ceiling is ideal for the signal propagation of the beacon;
- installation site below the ceiling makes the overall system more robust against disturbances/shadings by objects at the level of the corridor level in contrast to an installation of the beacon itself at the level of the corridor level;
- beacon is protected from manipulation/foreign access (inadvertent/malicious);
- lighting and services (e.g. locating services) are offered as an overall system "from one source" (i.e. system provider is also service provider);
- possibility of using the secure communication network of the light installation, e.g. to configure the beacon or link beacons with each other;
- unification of the installation processes of beacons and light installation;
- possibility of coupling to further system elements of the peripheral building infrastructure via the communication network of the light installation, e.g. elements of the safety technology;
- optically attractive system since the beacon can be non-visibly accommodated in the light installation.

A beacon can be arranged in or at an electrical lighting device. The beacon communicates with a terminal (e.g. smart device). Therein, the beacon is optionally connected to further beacons or to infrastructure elements via a communication link.

Within an area, humans and apparatuses optionally have the challenge to orient themselves, to navigate and to find and use other local digital services (e.g. apps or app functions, Google Maps, Lightify light control). The light installation with integrated beacon in an area becomes a locating or orientation system for these potentials of use. With the self-location of the terminal realizable thereby, services can now be provided such as for instance navigation or the provision of site-specific information.

Heretofore, each beacon had to be individually configured depending on the installation position to ensure an optimum signal coverage. Important influencing variables are for example the distance to the ceiling (suspended ceiling) and to the ground. In current solutions, the configuration is associated with high manual effort (mostly during the installation) and has to be separately performed for each beacon. A reconfiguration is usually even more expensive.

Variations of organic and water-rich objects, respectively, metals or electromagnetic field variations in the environment of the beacon have crucial effects (mostly negative) on the quality of the service. Moreover, the configuration of the room, in which the beacon lamps are installed, possibly varies optionally during the life cycle of the lamp. A further challenge is in that a different quality of the signal/service can be desired in different circumstances. However, an automatic adaptation of the parameters, which influence the quality, is not trivial and mostly associated with high latency.

Up to now, so-called Bluetooth smart sensors of the company Blukii are known. Moreover, in the book of H. F. Rashvand et al.: "Distributed Sensor Systems", published online: Feb. 27, 2012, ISBN: 9780470661246, distributed sensor systems in practical applications are described.

The object of the present invention is in allowing the configuration of a beacon in or at a lighting device for a specific site with less effort.

SUMMARY

According to the invention, this object is solved by a lighting system including
a lighting device and
a beacon arranged in or at the lighting device, wherein the lighting system comprises a sensor device for acquiring an environmental parameter relating to an environment of the lighting system, and
the beacon is formed to automatically configure itself based on the environmental parameter.

Accordingly, a lighting system comprises a lighting device and a beacon arranged in or at the lighting device. Thus, the beacon can for example benefit from the energy supply and/or the communication network of the lighting system. In addition, the lighting system comprises a sensor device for acquiring an environmental parameter relating to an environment of the lighting system. Accordingly, the sensor device can acquire an environmental parameter (e.g. air humidity, temperature or the like) at a specific site, at which the beacon is installed. The beacon then automatically uses this acquired environmental parameter for self-configuration. Thereby, it is no longer required to manually configure the beacon for certain environmental conditions.

Preferably, the sensor device is adapted to acquire a respectively current value of the environmental parameter in temporally recurrent manner and the beacon should therein be adapted to configure itself with the respectively current value of the environmental parameter in temporally recurrent manner. In this manner, the beacon can dynamically adapt to environmental variations by periodically performing self-configurations with current values from the environment.

In the self-configuration of the beacon, multiple parameters of the beacon can be adjusted. For example, a set of parameters consisting of a preset plurality of parameters can be newly adjusted in the configuration. Such parameters are for example transmitting intervals, signal strength, orientation and the like.

In a further advantageous configuration, the lighting system comprises at least one further lighting device and at least one further beacon associated with the further lighting device, wherein the two beacons are in a first communication link and the further beacon is formed to receive a value of the environmental parameter via the first communication link and to configure itself therewith. Thus, a network of beacons can for example be realized at respective lighting devices, wherein not all of the beacons have to be equipped with own environmental sensor technology. Rather, a single sensor device can also be used to provide multiple beacons with a value of an environmental parameter for the self-configuration. Optionally, multiple sensor devices are also distributed to multiple lighting devices or present separately therefrom in the lighting system and the values of the individual sensor devices are communicated to the beacons for self-configuration via a communication network.

In the lighting system with the multiple lighting devices and multiple beacons, it is advantageous if the lighting devices and beacons have a common communication device, via which the first communication link is established. Thus, beacons can for example jointly use the communication links of a light installation.

The lighting system can comprise a mobile terminal, which comprises a sensor, wherein the beacon is in a second communication link with the mobile terminal and is formed to receive a value of the sensor and to configure itself therewith. In this manner, the beacon can also use sensor values of mobile sensors or terminals for the self-configuration.

Furthermore, the lighting system can comprise a third communication link with a safety technology device or a building technology device and the beacon can be formed to obtain a value of a further environmental parameter from the safety technology device or the building technology device and to configure itself therewith. The one beacon or the multiple beacons can thus also use values from other systems to automatically configure themselves.

In a special configuration, it can be provided that the sensor device is in communication link with the beacon only via the lighting device. Therein, the sensor device does not have a direct link with the beacon. In this manner, an existing communication link between the sensor device and the lighting device can for example be used to communicate sensor values to the beacon.

The sensor device can be arranged directly in or at the beacon. Thereby, the sensor device and the beacon can for example comprise a common housing.

Alternatively, the sensor device can be in communication link directly with the beacon and a further sensor device can be in communication link with the beacon only via the lighting device, wherein a value of a further environmental parameter of the further sensor device is also used for configuring the beacon. Thereby, not only sensor data for the beacon becomes utilizable, which the beacon directly receives from a sensor device, but also that, which the beacon receives via a lighting device.

It is particularly preferred if the beacon comprises a set of rules, by which at least one association of a value of the environmental parameter with a preset value of a transmitting parameter of the beacon is given, for automatically configuring. Therein, not only the value of an environmental parameter can be changed in configuring, but also the association in the set of rules. Thereby, an even higher flexibility can be achieved.

Especially, the set of rules can be automatically changeable by configuring depending on the environmental parameter or one of the environmental parameters. This means that an automatic change of the set of rules is also effected in the automatic configuration.

The environmental parameter or one of the environmental parameters can be selected from: number of persons in a room, installation height of the beacon, ceiling distance of the beacon, distance of the beacon to other beacons, number of mobile terminals in communication link with the beacon and number or size of metallic objects in transmitting range of the beacon. Based on one or more of these environmental parameters, one or more of the following parameters of the beacon can be changed in configuring: transmitting interval, signal strength, ID number, direction of the signal, encryption parameter, activation state of a communication interface or supply interface and access authorization. Thereby, a high variation diversity arises in automatic self-configuration.

According to the invention, the above formulated object can also be solved by a method for configuring a beacon of a lighting system comprising a lighting device and the beacon in or at the lighting device, by acquiring an environmental parameter relating to an environment of the lighting system, and automatically self-configuring the beacon based on the environmental parameter.

Thus, a method for self-configuration of one or more beacons is advantageously also provided by acquiring an environmental parameter of the environment of the lighting system, based on which the automatic self-configuration is effected.

The functional features described above in context with the lighting system according to the invention can also be regarded as method features of the method according to the invention for configuring a beacon.

BRIEF DESCRIPTION OF THE DRAWINGS

Now, the present invention is explained in more detail based on the attached drawings, in which there show.

DESCRIPTION OF THE PREFERRED EMBODIMENTS

Figure 1:
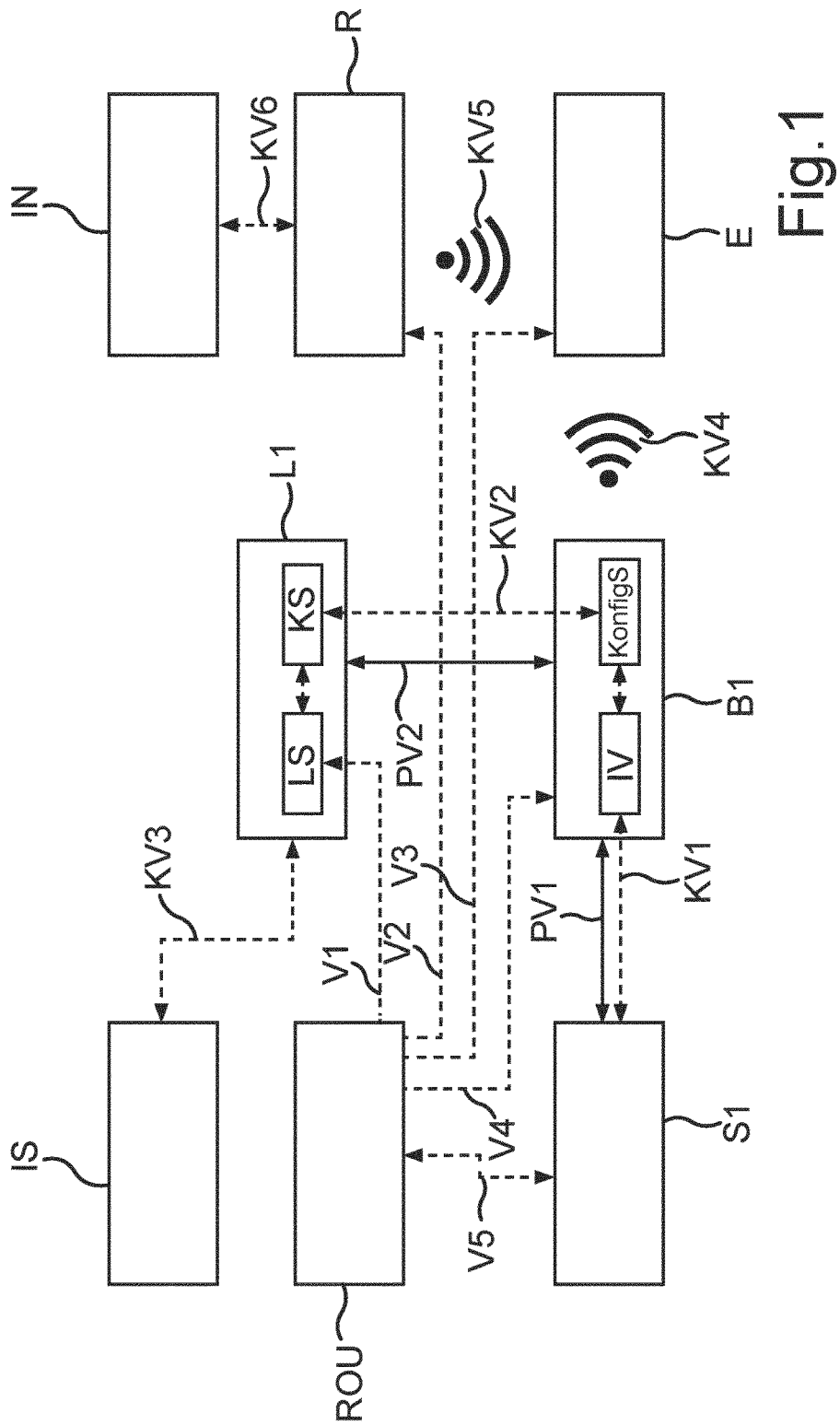
FIG. 1 a schematic diagram to the construction of a lighting system according to the invention with periphery.

The embodiments described in more detail below present preferred embodiments of the present invention. Therein, it is to be noted that the individual features can be realized not only in the described feature combinations, but also alone or in other technically reasonable combinations.

An exemplary lighting system comprises besides the actual lighting device at least one beacon arranged in or at the lighting device. Besides, the lighting system comprises a sensor device for acquiring an environmental parameter relating to an environment of the lighting system. This sensor device can for example comprise one or more temperature sensors or distance sensors. They can be arranged at or in the beacon or be part thereof. Alternatively, the sensor device or the sensors can also be attached in or at a light installation or a lighting system or be part thereof. Similarly, the sensor device can be part of a light control.

For the arrangement or accommodation of the sensor technology in the entire lighting system, there exist various variants (alternative and cumulative):

as a separate system element, which is mounted within the light installation/lamp or lighting device, e.g. at the housing of the lamp, as a system element in/at the beacon or as a part of the beacon, e.g. as an electronic component or electronic assembly on the circuit board of the beacon, as a system element in/at the light control or as a part of the light control, e.g. as an electronic component or electronic assembly on the circuit board of the ballast of the lamp, integrated in the housing of the light installation or lighting device and in particular integrated as a system element within a provided installation space of the housing, at the housing of the electronic ballast, on a LED circuit board of the light installation, in the intended installation space of the starter module in housings, which are provided for conventional fluorescent lamps and are no longer required due to a different technology, in/at an energy storage or as a part of an energy storage, e.g. an accumulator (temperature sensor) of the overall system, in the mount/socket of the light installation (e.g. power rail), as a LED, which can be used as a sensor at the same time, and as a sensor with integrated transducer and/or converter, e.g. for providing the energy parameters required by the beacon as a part of the overall system.

The beacon is formed for self-configuration or automatic configuration, that is for adjusting the beacon parameters based on sensor information and/or routines recorded thereto, e.g. by the integration of distance sensor technology for measuring the installation height or the distance of the ceiling or the distance to other beacons. The distances can for example be sensed and the beacon individually configures itself thereupon.

For example, a routine for a temporally recurrent procedure (for example every 10 minutes) can exist, in which the sensor data is queried and evaluated. Therein, the sensor data is associated with the beacon/transmitter(s) to be controlled in/at or as a part of the light installation or a light installation in the environment in terms of information technology (in relational manner) among other things. An environmental profile results from it, which includes e.g. the installation height, the number of the persons in the environment as approximate information on the signal attenuation or the air humidity. Based thereon, a configuration or a configuration profile can be derived by a recorded set of rules (i.e. an association rule for associating for example an environmental parameter with a transmitting interval, a signal strength and/or an orientation) or defined specifications (Example: If ceiling height X [mm], then adjust signal strength to Y [mW]; if relative air humidity Z [%], then signal strength*1.2).

In case of a limited storage capacity, the actual environmental profile can be compared to previously stored or expected profiles, for which a configuration profile is adjusted. Subsequently, the environmental profile and the configuration profile correlated therewith with the lowest deviation (based on the sensor information and the evaluation) can be adjusted.

The configuration profile includes e.g. beacon parameters such as transmitting interval, signal strength, ID number, direction of the signal, encryption parameters, activating communication or power interfaces or access control.

A routine for configuration of the beacon parameters, thus for self-configuration, can be recorded at different locations (compare FIG. 1):

Variant V1: Configuration profiles are recorded on information processing and light installation, e.g. in the lighting device, Variant V2: separate configuration apparatus, e.g. router, Variant V3: configuration profiles are recorded on the terminal, Variant V4: Configuration profiles are recorded on the microcontroller of the beacon or on the storage unit of the beacon, and Variant V5: separate configuration apparatus, e.g. in the sensor system.

Moreover, a configuration of other (neighboring) beacons in the environment of the system can also be effected, which are also in/at or part of a light installation and with which a communication link (e.g. via the peripheral infrastructure of the building or a wireless communication link between the beacons) exists, based on the sensor data and the routines correlated herewith. Thus, the sensor technology acquires parameters of another beacon in the environment (for example field strength), and subsequently, the parameters of this beacon in/at the other light installation are automatically configured.

Corresponding to a first concept, which is reproduced in FIG. 1, a sensor S1 (e.g. presence detector, image processing system, MAC address detector, SDK and APT detector or distance sensor) is arranged at/in a beacon B1 or part of the beacon B1. A communication link KV1 and a physical connection PV1 exist between the sensor S1 and the beacon B1. The beacon B1 comprises an information processing unit IV, by which the beacon B1 can configure itself among other things. Possibly, the sensor S1 can directly communicate with the information processing unit IV via the communication interface KV1. Furthermore, the beacon B1 comprises a configuration interface KonfigS, which is in communication with the information processing unit IV.

In the present example, the beacon B1 is arranged in or at a lighting device L1 or another component of a light installation according to a physical connection PV2. The lighting device L1 comprises a light control LS and a communication interface KS in communication therewith. The latter one is in communication link KV2 with the configuration interface KonfigS of the beacon B1.

The lighting device L1 and in particular the light control LS are in communication link KV3 with a peripheral infrastructure IS of a building (e.g. building management or central service server).

Furthermore, the beacon B1 is in wireless communication link KV4 with a terminal E (e.g. smart device). This communication link KV4 is preferably effected via the BLE standard. Furthermore, the terminal E is in wireless communication link KV5 with a router R for example by means of WiFi. There is a communication link KV6 between the router R and an infrastructure IN for services (e.g. Internet or central service server).

A routine for configuration of the beacon parameters based on sensor data of the sensor S1, which acquires an environmental parameter of the beacon B1 or the lighting device L1, is for example effected with the aid of a configuration profile. With the aid of such a configuration profile, one or more parameters of the beacon B1 can be adjusted. Such a configuration profile has one or more input quantities. The association of an input quantity with an output quantity of the configuration profile can for example be effected with the aid of a set of rules. Thus, a configuration profile can for example be: "Adjacent transmitter has failed, accordingly, the signal intensity is to be increased by a preset value", and at the same time "room is empty, accordingly, signal intensity is to be reduced by a further preset value".

The adjustment of the parameters or the configuration is automatically effected based on data of the sensor S1 or the sensor system for data acquisition for example of the room conditions and/or influencing factors relevant to signal propagation and signal coverage. Such signal influencing factors can also be person counters and height meters besides the mentioned presence detectors, distance sensors et cetera.

A routine ROU for configuration of the beacon parameters can be recorded at different locations of the lighting system. Hereto, FIG. 1 shows some variants V1 to V5, which were already mentioned above. Accordingly, according to variant V1, a routine ROU with one or more configuration profiles is recorded on the information processing of the light installation (e.g. electrical ballast of the lighting device L1). Corresponding to a variant V2, a routine ROU is recorded on a separate configuration apparatus, here the router R. According to variant V3, a routine ROU with one or more configuration profiles is recorded on the terminal E. Finally, a routine ROU can also be recorded on the microcontroller of the beacon B1 or on the storage unit of the beacon B1, thus in the information processing IV thereof, in a separate configuration apparatus, namely the sensor system or the sensor S1, according to variant V5.

Not only for a first configuration, but also for a reconfiguration of the beacon B1, environmental conditions (e.g. number of persons, installation height, ceiling distance, distance to other beacons, number of terminals, metallic objects and so on) can be acquired and corresponding parameters (e.g. transmitting interval, signal strength, ID number, direction of the signal, encryption parameter, activating communication or power interfaces or access control) can be adjusted.

Corresponding to an alternative second concept, the sensor S1 is not at/in the beacon B1, but at/in the lighting device L1 and is also in communication link with it and not with the beacon B1.

According to a third concept, both the first sensor S1, which is in communication link KV1 and in physical connection PV1 with the Beacon B1, and the sensor of the second concept, which is in communication link and in physical connection with the lighting device L1, are provided in the lighting system.

Corresponding to a fourth concept, the sensor S1 is provided in physical connection PV1 with the beacon B1 as in the first concept, but the communication link from the sensor S1 is effected with the light control LS of the lighting device L1 and not with the beacon B1. Thus, there is only an indirect communication link between sensor S1 and beacon B1 via the communication interface KS of the lighting device L1 and the configuration interface KonfigS of the beacon B1.

In case that the sensor technology is mounted at/in the light installation, the sensor data required for configuration of the beacon can be passed to the beacon e.g. via the communication technology of the light installation. The information processing of the light control LS could also be used for evaluating the sensor data.

Figure 2:
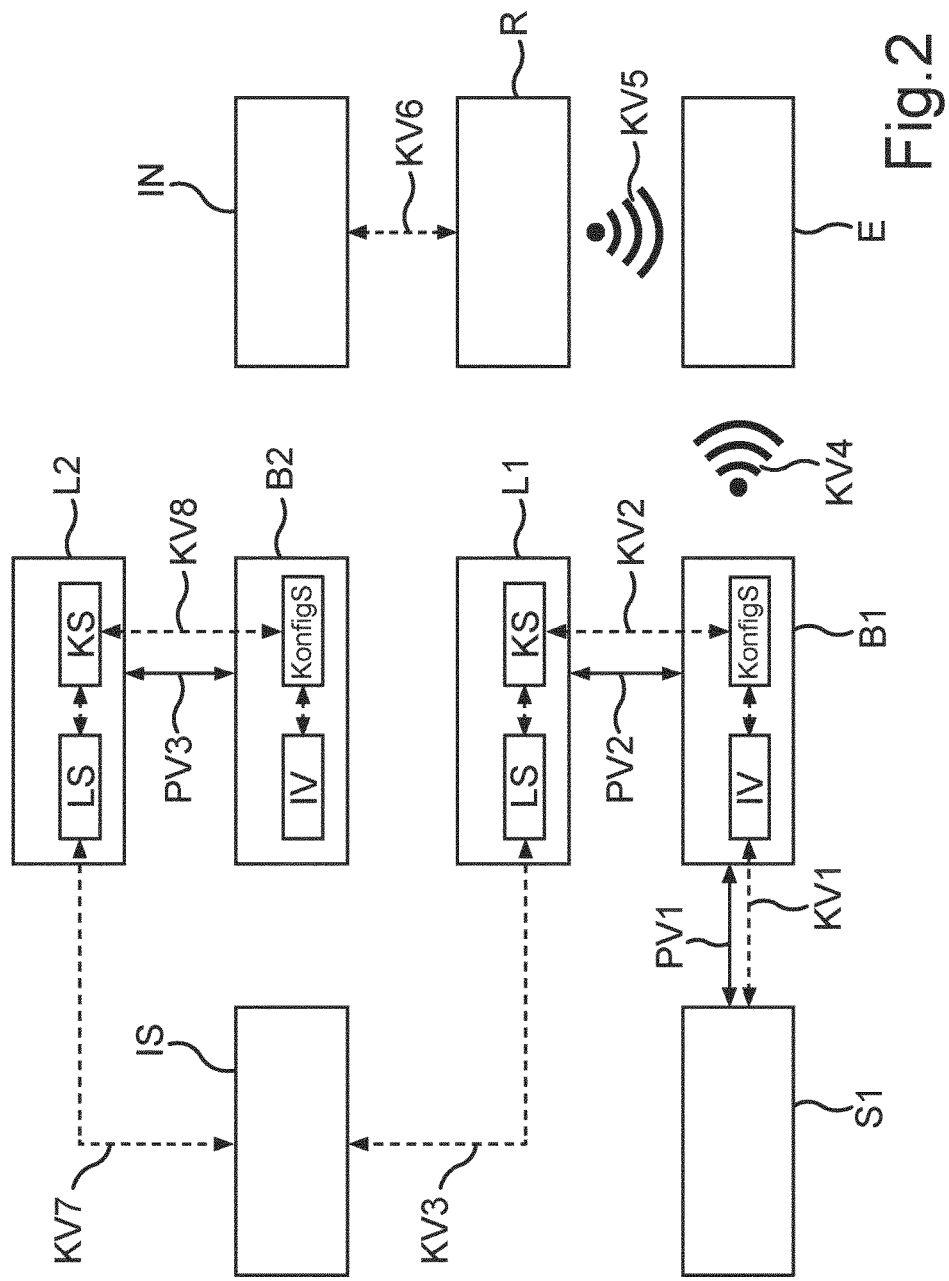
FIG. 2 a schematic construction of an alternative lighting system.

In a further embodiment according to FIG. 2, the lighting system of FIG. 1 is extended by a further lighting device L2, which itself comprises an own light control LS and a communication interface KS. The latter ones are in communication with each other. The light control LS is additionally in communication link KV7 with the peripheral infrastructure IS of the building. Furthermore, a second beacon B2 is arranged in or at the lighting device in physical connection PV3. This beacon B2 too comprises an information processing IV in communication with a configuration interface KonfigS. The latter one is in communication link KV8 with the communication interface KS of the further lighting device L2.

This fifth concept addresses the arrangement of the sensor S1 in/at the or as a part of the beacon B1 similarly as the first concept according to FIG. 1. A communication link KV1 as well as a physical connection PV1 exist between sensor S1 and beacon B1. Moreover, a communication link KV7 with at least one further light installation or lighting device L2 with integrated beacon B2 exists via the peripheral infrastructure IS of the building. In the outlined concept, the sensor S1 accordingly acquires parameters (e.g. field strength) at the first beacon B1 and subsequently the parameters of this beacon B1 and optionally also the parameters of the beacon B2 of the other lighting device are changed via corresponding routines within the scope of a self-configuration.

Figure 3:
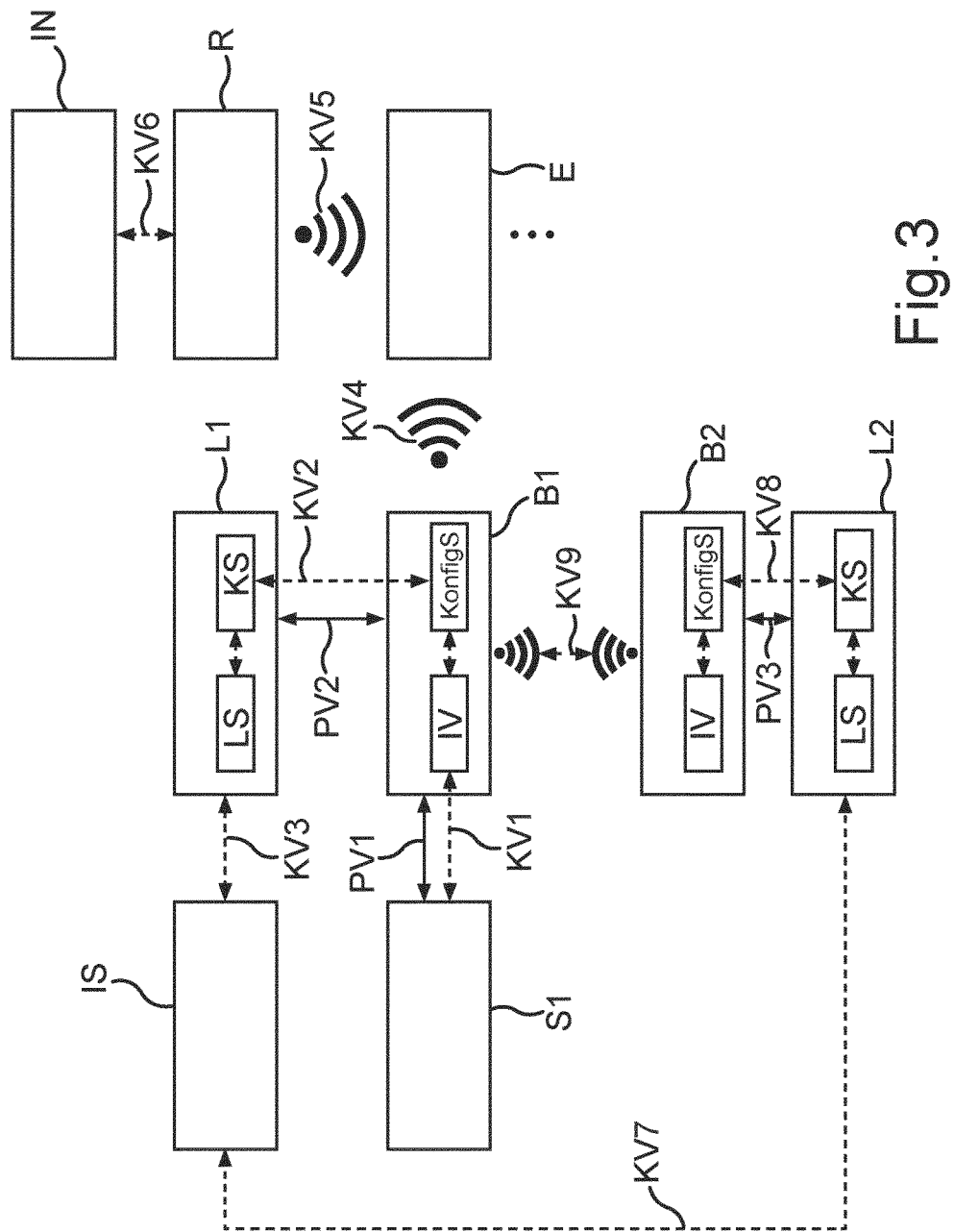
FIG. 3 the schematic construction of a further implementation variant of a lighting system according to the invention.

A sixth concept according to FIG. 3 structurally corresponds approximately to the fifth concept of FIG. 2. Here too, a second lighting device L2 and a second beacon B2 are provided. However, corresponding to this sixth concept, there is a direct wireless communication link KV9 between the first beacon B1 and the second beacon B2. Environmental parameter values or configuration information for the automatic self-configuration can therefore be directly transmitted from beacon to beacon. Preferably, an intelligent data reduction of sensor data is effected by processing in the respective beacon or by the information processing elements of the light installation L1 and L2, respectively. Thereafter, forwarding e.g. to other beacons or to the light management system is effected for example via a beacon communication network or the network of the light installation.

Here as well as in the other concepts, an environmental acquisition by linked sensors, i.e. utilization of sensor information (acceleration, temperature et cetera) of the terminal or the terminals can be effected. Subsequently, communication to a transmitting/receiving unit of the beacon/the light installation (for example terminal as a light controlling element) can be performed. Further, utilization of further sensor data, which is for example combined via the communication network of the light management system, e.g. by elements of the safety technology/building technology (e.g. smoke detectors, fireboxes, doors), can be effected here too. This can in particular be of importance with regard to a dangerous situation or an evacuation scenario.

In all of the embodiments, energy interfaces from the beacons to the respective light installation or lighting device L1, L2 can be provided. Such energy interfaces can be combined with the mechanical interfaces or communication interfaces.

The features and variation possibilities mentioned above with the individual concepts can be transferred to the other concepts. Any other combination possibilities of the features are also conceivable.

Advantageously, the optimum self-configuration of the beacon results based on environmental sensor data and predefined configuration profiles in a minimum effort in the installation of the beacon lamp both for the operator (e.g. owner of a supermarket) and for the installer of the lamps. Optionally, personnel trained in handling beacons is not required for the installation.

A further advantage is in that post-configurations optionally required with changed room situations can be completely omitted. In addition, misadjustments of beacon parameters, in particular transmitting interval and signal strength, and poor service coverages arising thereby can be avoided. In that the beacon signal is adapted to the circumstances or to certain parameters, a desired quality of the service associated therewith (locating, content) can be provided (improving the accuracy of locating; minimizing and optimizing undesired signal gaps, respectively; avoiding undesired service failures). The influence of e.g. humans in the environment of the installation on the signal quality and signal propagation and coverage, respectively, can also be minimized. Thereby, quality fluctuations can be compensated for.

The invention claimed is:

1. A lighting system comprising:
   a lighting device and
   a beacon arranged in or at the lighting device,
   wherein
   the lighting system comprises a sensor device for acquiring an environmental parameter relating to an environment of the lighting system, and
   the beacon is formed to automatically configure itself based on the environmental parameter.

2. The lighting system according to claim 1, wherein the sensor device is adapted to acquire a respectively current value of the environmental parameter in a temporally recurrent manner and the beacon is adapted to configure itself with the respectively current value of the environmental parameter in the temporally recurrent manner.

3. The lighting system according to claim 1, wherein multiple parameters of the beacon are adjusted in the self-configuration of the beacon.

4. The lighting system according to claim 1, further comprising:
   at least one further lighting device and
   at least one further beacon associated with the further lighting device,
   the two beacons are in a first communication link and the further beacon is formed to receive a value of the environmental parameter via the first communication link and to configure itself therewith.

5. The lighting system according to claim 4, wherein the two lighting devices and the two beacons have a common communication device, via which the first communication link is established.

6. The lighting system according to claim 1, further comprising:
   a mobile terminal, which comprises a sensor,
   wherein the beacon is in a second communication link with the mobile terminal and is formed to receive a value of the sensor and to configure itself therewith.

7. The lighting system according to claim 1, further comprising:
   a third communication link with a safety technology device or a building technology device, and
   the beacon is formed to obtain a value of a further environmental parameter from the safety technology device or the building technology device and to configure itself therewith.

8. The lighting system according to claim 1, wherein the sensor device is in a communication link with the beacon only via the lighting device.

9. The lighting system according to claim 1, wherein the sensor device is arranged directly in or at the beacon.

10. The lighting system according to claim 1,
    wherein the sensor device is in a communication link directly with the beacon and a further sensor device is in a communication link with the beacon only via the lighting device, and
    wherein a value of a further environmental parameter of the further sensor device is also used for configuring the beacon.

11. The lighting system according to claim 1, wherein the beacon comprises a set of rules for automatically configuring, by which at least one association of a value of the environmental parameter with a preset value of a transmitting parameter of the beacon is given.

12. The lighting system according to claim 11, wherein the set of rules is automatically variable by the configuration depending on the environmental parameter or one of the environmental parameters.

13. The lighting system according to claim 1, wherein the environmental parameter or one of the environmental parameters is selected from: number of persons in a room, installation height of the beacon, ceiling distance of the beacon, distance of the beacon to other beacons, number of mobile terminals in a communication link with the beacon and number or size of metallic objects in a transmitting range of the beacon.

14. The lighting system according to claim 1, wherein one or more of the following parameters of the beacon are variable by the configuration of: transmitting interval, signal strength, ID number, direction of the signal, encryption parameter, activation state of a communication interface or supply interface and access authorization.

15. A method for configuring a beacon of a lighting system, which comprises a lighting device and the beacon in or at the lighting device, the method comprising:
    acquiring an environmental parameter relating to an environment of the lighting system, and
    automatically self-configuring the beacon based on the environmental parameter.

\* \* \* \* \*